July 5, 1960 T. A. ST. CLAIR 2,943,871
TUBE COUPLING WITH DEFORMABLE PIPE GRIPPING CUTTING MEANS
Filed Oct. 25, 1956 3 Sheets-Sheet 1

INVENTOR.
THEODORE A. ST. CLAIR
BY
RICHEY, WATTS, EDGERTON & McNENNY
ATTORNEYS

INVENTOR.
THEODORE A. ST. CLAIR
BY
RICHEY, WATTS, EDGERTON & McNENNY
Donald W. Farrington
ATTORNEYS July 5, 1960

T. A. ST. CLAIR 2,943,871

TUBE COUPLING WITH DEFORMABLE PIPE GRIPPING CUTTING MEANS

Filed Oct. 25, 1956

INVENTOR.
THEODORE A. ST. CLAIR

BY
RICHEY, WATTS, EDGERTON & McNENNY

Donald W. Farrington
ATTORNEYS

> United States Patent Office 2,943,871
Patented July 5, 1960

2,943,871

TUBE COUPLING WITH DEFORMABLE PIPE GRIPPING CUTTING MEANS

Theodore A. St. Clair, Chagrin Falls, Ohio, assignor, by mesne assignments, to Paul D. Wurzburger, Cleveland, Ohio Filed Oct. 25, 1956, Ser. No. 618,207

1 Claim. (Cl. 285—342)

This invention relates to tube couplings, and more specifically to couplings referred to as "short" or "close" couplings, that is, couplings wherein the tube and coupling elements may be positioned and aligned for tightening of the coupling by sliding the tubes together laterally without requiring appreciable relative axial motion.

Tube couplings enjoying wide usage are characterized by a cutting ring which shears up a shoulder on the tube to be gripped corresponding to the disclosure of Kreidel Patent No. 2,139,413.

Recent improvements in tube couplings include an arrangement wherein the parts are adapted for "short" or "close" couplings as disclosed in Wurzburger Patent No. 2,693,374.

The present invention relates to a tube coupling suited for short coupling wherein the forward end of the ring is rotated into seating engagement with the body of the coupling and the rearward portion of the ring cuts into and shears up a shoulder on the tube.

A coupling of the present embodiment comprises a body having a slight annular recess adapted to receive the forward end of a cutting ring, and a connector nut provided with a bore having a frusto-conical portion of an internal diameter to receive the rearward portion of the cutting ring. A tube to be coupled abuts the body and the cutting ring is sheared into the tube with the forward end engaging the body as the connector nut is moved toward the body.

An object of my invention is to provide a coupling which enables the operator to determine when the coupling has been completed as by a marked increase in wrench torque.

Another object of my invention is to provide a cutting ring having a portion between the forward end and the rearward portion that is foreshortened when compressed between the connector nut and the body.

In other couplings the body is provided with an elongated taper to receive the cutting ring, and the cutting action takes place on the tube projected within the body. In the short coupling herein disclosed the cutting edge of the ring engages the tube at a portion spaced from the body and the ring is foreshortened as mentioned above.

In cutting rings for tube couplings, a cutting edge is provided for shearing into the tube, said cutting edge being difficult to harden without hardening the remainder of the cutting ring. Thus distortion of the cutting ring upon assembly must be held to a minimum to prevent mechanical failure thereof.

A further object of my invention is to provide a cutting ring which may be foreshortened with a minimum of distortion.

The manner in which these objects and advantages may be accomplished will be apparent from the following detailed description of a preferred embodiment of my invention.

Figure 1:
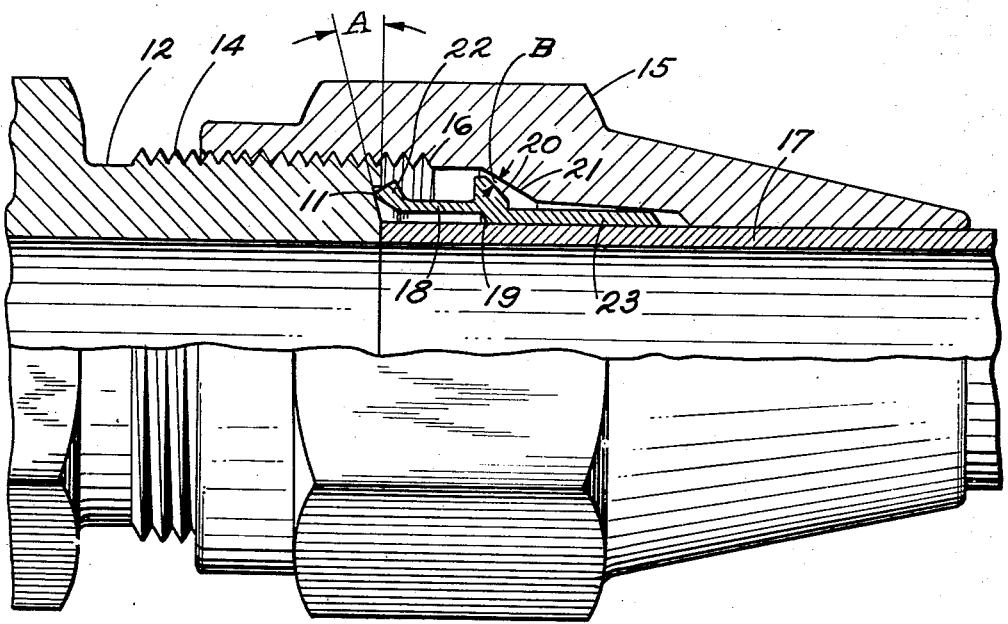
Fig. 1 is a partial section of a short coupling embodying the undistorted cutting ring of my invention.

It is to be noted in Fig. 1 that the connector body 12 is provided with a slight annular recess 11 forming an angle A with the vertical as shown in the drawing. A connector nut 15 is provided with threads 16 adapted to engage threads 14 of the body so that the nut can be made up to the body. Said nut is also provided with a bore therethrough having a frusto-conical portion 21 to be hereinafter described.

A tube 17 is shown abutting body 12 and adjacent the lower portion of annular recess 11. Surrounding tube 17 at the end thereof is a cutting ring 18 having an annular cutting edge 19 residing in the spacing between connector nut 15, connector body 12 and tube 17. An annular inclined projection 20 of cutting ring 18 is adapted to be engaged by the frusto-conical portion 21 of nut 15. The inclined projection and the frusto-conical portion form an acute angle B substantially as shown in Fig. 1. Integral with cutting ring 18 is an annular forward flange 22 adapted to make line contact with recess 11 prior to coupling. A rearward extension portion 23 of cutting ring 18 is shown and may be necessary for vibration damping but does not form a part of my invention.

Figure 2:
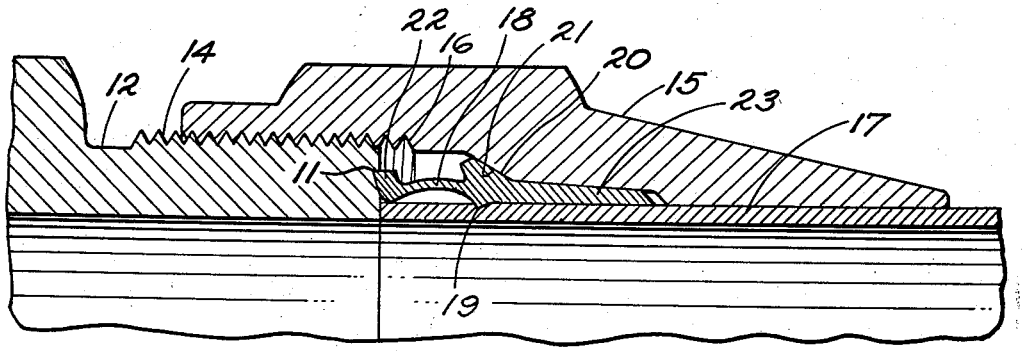
Fig. 2 is a sectional view of the coupling of Fig. 1 wherein the cutting ring is shown foreshortened by the drawing up of the nut to the body.

The coupling as viewed in Fig. 2 discloses the nut 15 drawn up to body 12 with the frusto-conical portion 21 of the nut engaging the inclined projection 20 of ring 18 reducing acute angle B to zero. Thus the forward flange 22 of cutting ring 18 is in forceful engagement with recess 11 and cutting edge 19 is caused to shear into tube 17. As cutting ring 18 is forced against connector body 12 at recess 11 the forward flange portion 22 is caused to roll in a clockwise direction, as viewed in the drawing, thereby filling the recess 11 and undergoing a diameter reduction so as to position a forward flange 22 in sealing engagement with tube 17 and connector body 12.

The forces acting on the cutting ring 18 when the nut is drawn up to the body foreshortens the ring as at a portion between the forward flange and the projection 20 thereby allowing the movement of the cutting edge with respect to the forward flange and the tube whereby a seat for the ring is sheared in the tube.

In other words, the line contact of flange 22 with connector body recess 11 at a position radially outward of the axial force allows the rotation of flange 22 as described above and a short coupling of a tube is made with a minimum of distortion of cutting ring.

Figure 3:
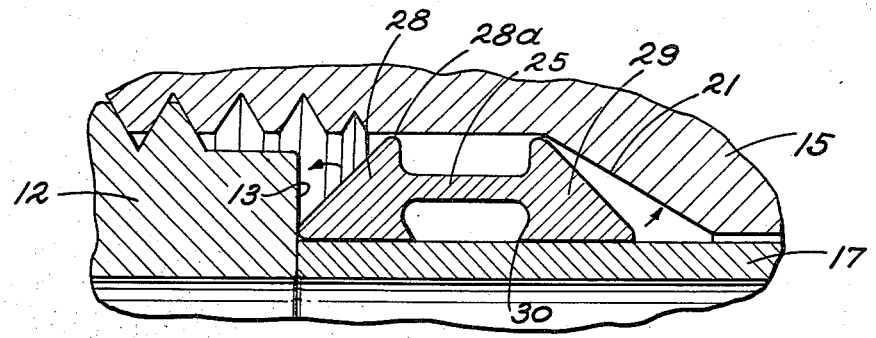
Fig. 3 is a sectional view of another form of cutting ring for use in a short coupling.
Figure 6:
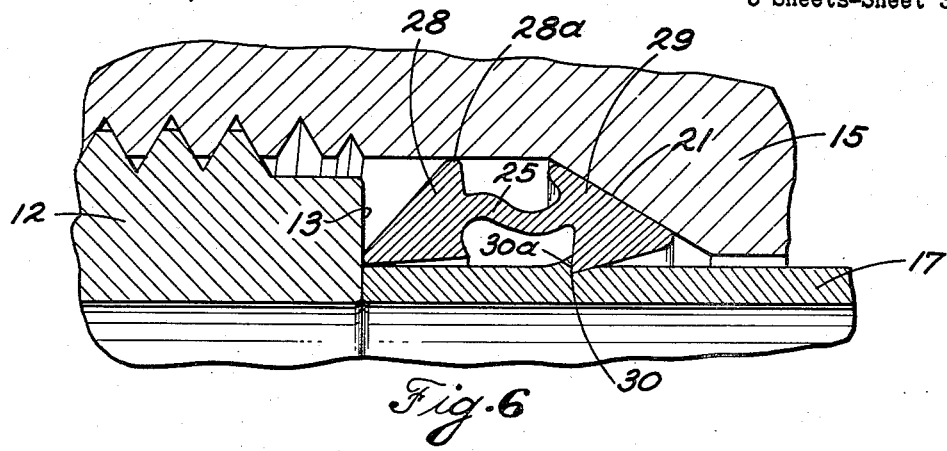
Fig. 6 is a sectional view showing the ring of Fig. 3 drawn up to the body.

In Fig. 3, another form of a cutting ring is shown in section prior to nut 15 being drawn up to body 12. Rearward portion 29 of the ring and the forward portion 28 of the ring are substantially identical with the edge 30 provided on portion 29 used for cutting. The frusto-conical portion 21 of nut 15 is adapted to engage cutting ring 25 at the rearward beveled portion 29. As the nut is drawn up to the body, forward portion 28 is forced against body face 13 with a rotation in a counter-clockwise direction until portion 28a strikes the bore of nut 15 as shown in Fig. 6. Thus the forward portion 28 is secured between the juncture of tube 17 and face 13, and the bore of the nut. Rearward portion 29 is likewise rotated in a counter-clockwise fashion so that the rearward beveled portion fully engages surface 21, and cutting edge 30 cuts into the outer surface of tube 17 to shear up a shoulder 30a thereon. The central portion of cutting ring 25 is caused to distort and foreshorten as shown in Fig. 6. Thus the coupling is completed with a sealing occurring at the juncture of the body 12 and the end of tube 17 and at the point where the cutting edge 30 is sheared into the tube.

Figure 4:
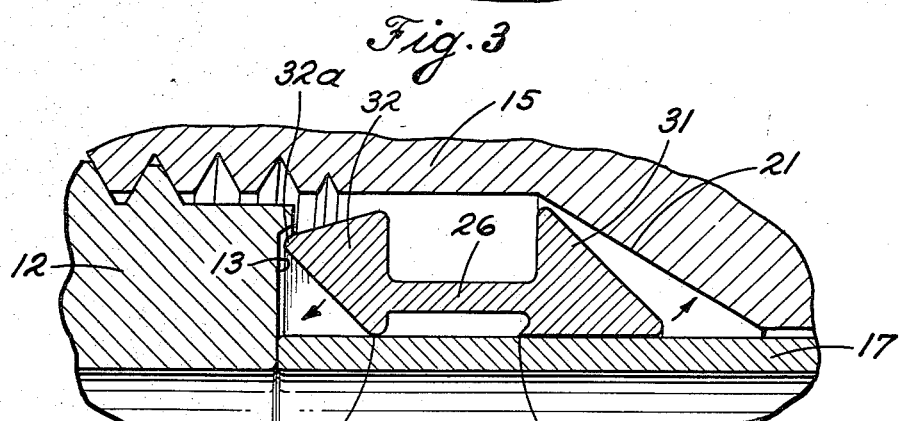
Fig. 4 is a sectional view of another form of ring for use in a short coupling.
Figure 7:
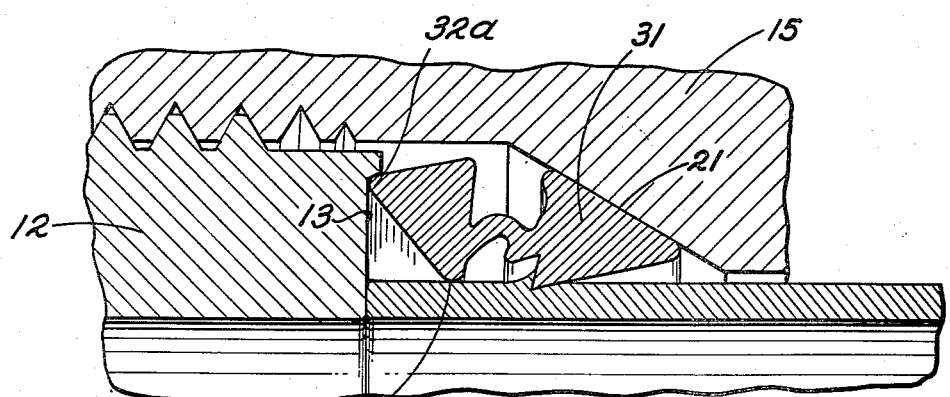
Fig. 7 is a sectional view showing the ring of Fig. 4 drawn up to the body.

Fig. 4 discloses another form of cutting ring prior to the nut 15 being drawn up to body 12. The frusto-conical section 21 is adapted to engage rearward bevelled portion 31, and the fluid portion 32 is adapted to engage recessed face 13. As the nut is drawn up to the body, the forward extension 32a of portion 32 is seated in recess 13 as shown in Fig. 7. Thus the forward portion 32 of ring 26 is secured between recess 13 and the tube 17 at portions 32a and 32b. At the same time, rearward portion 31 is caused to rotate in a counter-clockwise direction so that surface 21 fully engages rearward beveled portion 31, with cutting edge 33 shearing into the surface of tube 17. The central portion of the ring 26 is distorted and foreshortened.

Figure 5:
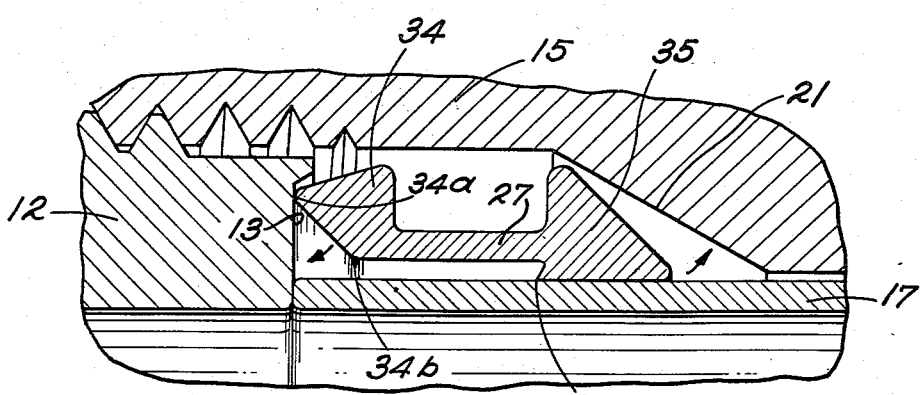
Fig. 5 is a sectional view of yet another form of cutting ring for use with a short coupling.
Figure 8:
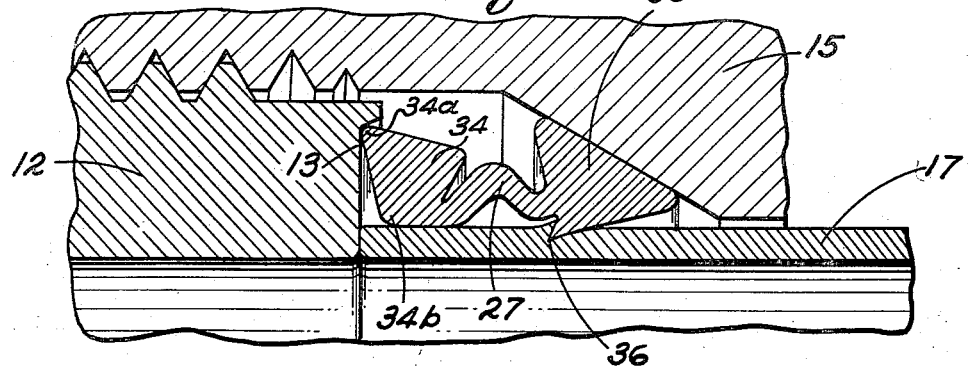
Fig. 8 is a sectional view showing the ring of Fig. 5 drawn up to the body.

In Fig. 5, another form of cutting ring is disclosed wherein only the rearward portion 35 is in initial contact with the surface of tube 17. In drawing up nut 15 to body 12, a forward portion 34 engages recessed face 13 at portion 34a, and lower portion 34b engages the outer surface of tube 17. The rearward portion 35 is rotated in a counter-clockwise direction by the action of surface 21 causing cutting edge 36 to shear up a shoulder on the outer surface of tube 17, and the central portion of ring 27 is foreshortened as shown in Fig. 8. Thus, a coupling is established between body 12 and tube 17, with sealing occurring at portions 34a, 34b and where cutting edge 36 has sheared up a shoulder on the tube.

I have described a plurality of novel cutting rings particularly adapted to the short coupling of tubes to a connector body and have provided cutting rings which undergo a minimum of distortion yet forming a suitable solid sealed coupling of the tube with the body.

Although I have shown and described four forms of a short coupling in detail it will be appreciated by those skilled in the art that colorable variations may be made without departing from the scope of the invention as defined in the appended claim.

What is claimed is:

In a tube coupling comprising a body member, a cutting ring to engage the tube to be coupled and a nut, said body member having an axial bore corresponding to the inner diameter of the tube to be coupled, said body having an end face, said end face having an annular flat face portion normal to the tube axis and substantially the same thickness as the tube wall adjacent said bore, said end face having an annular recess outwardly beyond said annular flat face, said recess having an inclined face sloping away from the end of the tube and an outer cylindrical wall concentric with the wall of the tube, said ring comprising a rear cylindrical portion having an inner diameter corresponding to the outer diameter of the tube, and a forward cylindrical portion having an inner wall spaced outwardly from the outer wall of the tube, said forward cylindrical portion having an outer wall spaced inwardly with respect to the cylindrical wall of said recess, said ring having a cutting edge formed at the juncture between the two different inner diameters of the ring, said ring having a forward section thickened with respect to the walls of the ring and being outwardly flared at the extreme forward end of the ring, said thickened end section having its inner peripheral edge portion terminating in said recess in the end face of the body adjacent the outer cylindrical wall of said recess, said flare having a length corresponding substantially to the length of the sloping face of the recess, said cutting ring having a shoulder at the exterior thereof opposite the juncture between the two cylindrical portions of the ring, said shoulder having an inclined face, said nut having an interior inclined shoulder opposite the shoulder on the ring, the inclined shoulder of the nut being at a lesser angle to the axis of the tube than the inclined face on the ring shoulder and means to draw the nut on the body whereby the shoulder of the nut engages the shoulder of the ring and moves the ring forward to tilt the outwardly flared thickened end section in a clockwise direction and buckle the ring wall outwardly away from the tube between the shoulder and the thickened forward end portion and thereby move the portion of the ring inwardly of the flared end inwardly against the end of the tube with the interior of the flare against the sloping wall of the recess and the shoulder on the ring tilted in a counter-clockwise direction as the cutting edge of the ring cuts into the outer surface of the tube.

References Cited in the file of this patent

UNITED STATES PATENTS

| 1,840,312 | Dunmire | Jan. 12, 1932 |
| 2,693,374 | Wurzburger | Nov. 2, 1954 |
| 2,693,375 | Wurzburger | Nov. 2, 1954 |
| 2,693,376 | Wurzburger | Nov. 2, 1954 |
| 2,693,377 | Wurzburger | Nov. 2, 1954 |
| 2,749,152 | Courtot | June 5, 1956 |
| 2,823,935 | Wurzburger | Feb. 18, 1958 |

FOREIGN PATENTS

| 86,771 | Sweden | July 7, 1936 |